Figure 1:
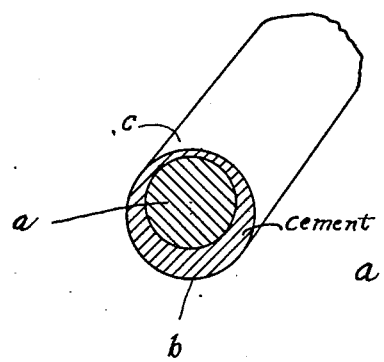

Jan. 9, 1923.    1,441,685.
E. H. JONES.
ELECTRIC ARC SOLDERING.
FILED SEPT. 18, 1918.

INVENTOR:
Ernest Henry Jones
By Wm Wallace White
ATTY.

Patented Jan. 9, 1923.

1,441,685

UNITED STATES PATENT OFFICE.

ERNEST HENRY JONES, OF LONDON, ENGLAND.

ELECTRIC-ARC SOLDERING.

Application filed September 18, 1918. Serial No. 254,656.

*To all whom it may concern:*

Be it known that I, ERNEST HENRY JONES, subject of the King of Great Britain, residing at 4 Grange Road, Canonbury, London, England, have invented new and useful Improvements in Electric-Arc Soldering, of which the following is a specification.

In order to prevent the oxidation of the molten metal, metal electrodes used in soldering by the electric arc, or in the deposition of metal by the same means, are provided with a casing or coating which fuses in the electric arc and forms a protective slag to prevent access of air to the molten metal.

Various substances in which silica predominates, are used to form this casing for the electrodes, and among others may be mentioned, iron ore sand in the form of slag sand or slag wool, or in other convenient form; asbestos formed into yarn soaked or smeared with silicate of soda and wound on to the electrode; mixtures of crushed limestone, carbonate of potassium and silicate of alumina, with or without magnesite or dolomite, or bauxite, and other materials, mixed into a paste with water or spirits, or a mixture of boracic acid, pumice stone, bicarbonate of soda, lampblack or powdered charcoal mixed with water, into either of which the electrode may be dipped so as to obtain a coating which is allowed to dry on but these mixtures, not being in the nature of a cement, readily break away from the electrode.

Hitherto the principal difficulty experienced in the casing of these electrodes has been to apply the casing so that it shall firmly adhere to the electrode and be of even and regular thickness throughout, as regularity of working cannot be obtained if there is any unevenness in the thickness of the casing, since the electric arc inevitably flies to the thin side of the casing and renders regular deposition of metal very difficult to control, but advantage is taken of what is at present a defect, in the latter part of this specification.

By this invention I compound the substances to form the casing of such material as to form a cement which shall set on drying, and I may take for example, 3 parts of finely powdered slag sand and 1 part of slacked lime mixed with a sufficiency of water, and to render the compound more tenacious I may add to the water for example, a proportion of silicate of soda or other suitable silicious material.

It is obvious that a ready made cement may be used with the silicious material, and such may be used if it is free from any substance which may have a deleterious effect upon the molten metal.

It is necessary that whatever compound is used shall be capable of being extruded under pressure upon the electrodes by means of an extruding machine through an opening or die. The electrode may subsequently be drawn through a heated pipe in order to dry and set the coating.

The extruding machine may be similar in design, for example, to the well known machine for covering electric cables with lead.

The operation of coating the electrodes may be made continuous by drawing wire through a straightening machine, then through the extruding machine, and finally through a drying pipe before being cut into suitable lengths.

Figure 2:
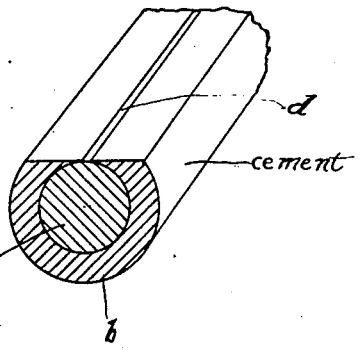

In the accompanying drawings exaggerated sections of electrodes are shown, Fig. 1 representing an electrode provided with a casing which is thin along one side and Fig. 2 representing an electrode provided with a casing which is removed from one side to bare the electrode. *a* is the electrode, and *b* is the casing.

In using a prepared electrode it has been mentioned above that the electric arc flies to the thin side of the casing *b*, and according to the thinness of the casing at that point the arc is projected outwardly more or less, and where the casing has been purposely made very thin as shown at *c* in Fig. 1 or the electrode has been bared as shown at *d* in Fig. 2 the arc is projected outwardly almost to a right angle, and accordingly I purposely provide a thin side to certain electrodes or bare one side of the electrodes so that the arc may be projected towards the line of welding or soldering in order to preheat it in advance of the actual welding or soldering operation, and by this means I moderate the effect of the arc at the actual point of contact with the work and gain very materially in efficiency. By the same means a slight irregularity in the remaining portion of the casing would not cause the arc to fly to that part.

I claim:—

1. In metal electrodes for electric arc soldering, compounding the materials of the casing to form a cement which sets on drying as set forth.

2. In the method of forming metal electrodes for electric arc soldering as claimed in the preceding claim, using a ready made cement as set forth.

3. In metal electrodes for electric arc soldering a casing having a thin side or a baring of one side of the metal to locate the arc as set forth.

4. In metal electrodes for electric arc soldering, compounding the materials of the casing to form a cement, extruding the same upon the electrode, and allowing the casing to set on drying, as set forth.

5. In metal electrodes for electric arc soldering, compounding the materials of the casing with a suitable ready made cement, extruding the same upon the electrode, and allowing the casing to set on drying, as set forth.

6. In metal electrodes for electric arc soldering, compounding together 3 parts of finely powdered slag sand, 1 part of slaked lime, mixing therewith a sufficient quantity of water to form a paste, adding thereto a sufficient quantity of a silicious material to render the paste adhesive, and extruding said paste upon the electrode to form a casing therefor.

In testimony whereof I have signed my name to this specification.

ERNEST HENRY JONES.